United States Patent [19]

Schwanauer

[11] 3,828,271

[45] Aug. 6, 1974

[54] CLOCK AND SECTOR MARK GENERATOR FOR ROTATING STORAGE UNITS

[75] Inventor: Francis J. Schwanauer, Agoura, Calif.

[73] Assignee: Burroughs Corporation, Detroit, Mich.

[22] Filed: July 27, 1973

[21] Appl. No.: 383,162

[52] U.S. Cl. ...................... 331/1 A, 331/17, 331/25, 340/174.1 A

[51] Int. Cl. ........................... H03b 3/04, H03k 1/16

[58] Field of Search ................. 331/1 A, 17, 18, 25; 340/174.1 A

[56] References Cited

UNITED STATES PATENTS

| | | | |
|---|---|---|---|
| 3,421,105 | 1/1969 | Taylor | 331/17 X |
| 3,577,132 | 5/1971 | Anderson et al. | 340/174.1 A |
| 3,670,255 | 6/1972 | De Nicolay et al. | 331/25 |

*Primary Examiner*—Herman Karl Saalbach
*Assistant Examiner*—Siegfried H. Grimm
*Attorney, Agent, or Firm*—Albin H. Gess; Benjamin F. Spencer; Edward G. Fiorito

[57] ABSTRACT

In a rotating storage unit such as a disk pack drive wherein encoded data is recorded on concentric tracks on the disk, the clock signal that times the data as it is recorded on a track or times the data as it is read from a track, along with sector indications, is accurately synthesized from the occurrence of a once-per-revolution signal (index signal) which is slaved to the rotational speed variations of the disk. This index signal may be recorded on the disk. The index signal synchronizes a voltage controlled oscillator to generate the clock pulses. These clock pulses are divided down by a variable modulo counter to produce sector indicating signals. These sector indicating signals are divided down to a once-per-revolution signal that is compared in time of occurrence to the index signal from the disk. The time difference between these two signals generates a control signal that regulates the voltage controlled oscillator.

10 Claims, 3 Drawing Figures

CLOCK AND SECTOR MARK GENERATOR FOR ROTATING STORAGE UNITS

BACKGROUND OF THE INVENTION

The present invention relates generally to improvements in clock and sector mark generators, and more particularly, pertains to new and improved clock signal and sector mark signal producing circuitry for use with rotating storage mediums wherein the clock and sector mark signals are synthesized from a one-per-revolution signal that is related to the speed variations of the rotating storage medium.

Binary coded data that is stored on rotating storage media on concentric tracks if formatted into sections of track called sectors. Each sector contains a record which may be composed of a plurality of data words, each word being composed of a plurality of data bytes, each byte being composed of a plurality of bits. In order to retrieve information, or write information, that is formatted in this manner, clock pulses, one clock pulse for each bit recorded or read, and sector mark signals, that accurately coincide with the data recorded on the rotating storage medium, must be generated.

Prior art techniques have been to generate sector mark signals by electromagnetic detection of machined slots on the edge of the rotating medium, which may be a disk, or to record a unique bit format at the beginning of each sector which can be detected and provide an indication of the beginning of a sector. Prior art techniques for producing a clock signal involved the use of a crystal oscillator which was independent of the speed variations inherent in the rotating storage medium. Or, the prior art utilized phase locked oscillators that were locked into the rotational variations of the rotating storage medium by pulses generated by the sensing of teeth on a wheel connected to the spindle of the rotating storage medium. An example of such a system is the one described and claimed in U.S. Pat. No. 3,577,132, for "Phase Locked Oscillator For Storage Apparatus".

The electromagnetic generation of sector mark signals and reference pulses for synchronizing a phase locked oscillator are valid techniques that are sufficient for low density recorded data. These prior art techniques, however, do not permit rapid and easy changing of the number of sectors per track. The toothed wheel mechanisms used are cumbersome and not of the precision required for high density recording.

SUMMARY OF THE INVENTION

The object of this invention is to provide an improved clock and sector mark generator for use with a rotating storage medium.

The object of this invention and its general purpose is accomplished by utilizing a once-per-revolution signal synchronized to the rotational speed variations of the rotating storage medium to synthesize clock and sector mark signals. A voltage controlled oscillator produces clock signals. These clock signals are divided down by a variable modulo counter to produce the sector mark signals. The sector mark signals are divided down to produce a once-per-revolution pulse that is compared, in time of occurrence, with the once-per-revolution signal from the rotating storage medium, the difference therebetween resulting in a control signal for regulating the frequency of the clock signals from the voltage controlled oscillator. A signal related to the speed of the rotating storage medium controls the response time of the above circuitry.

BRIEF DESCRIPTION OF THE DRAWINGS

Other objects and many of the attendent advantages of this invention will be readily appreciated as the same becomes better understood by reference to the following detailed description when considered in conjunction with the accompanying drawings in which like reference numerals designate like parts throughout the figures thereof and wherein.

DESCRIPTION OF THE PREFERRED EMBODIMENTS

Figures 1, 2:
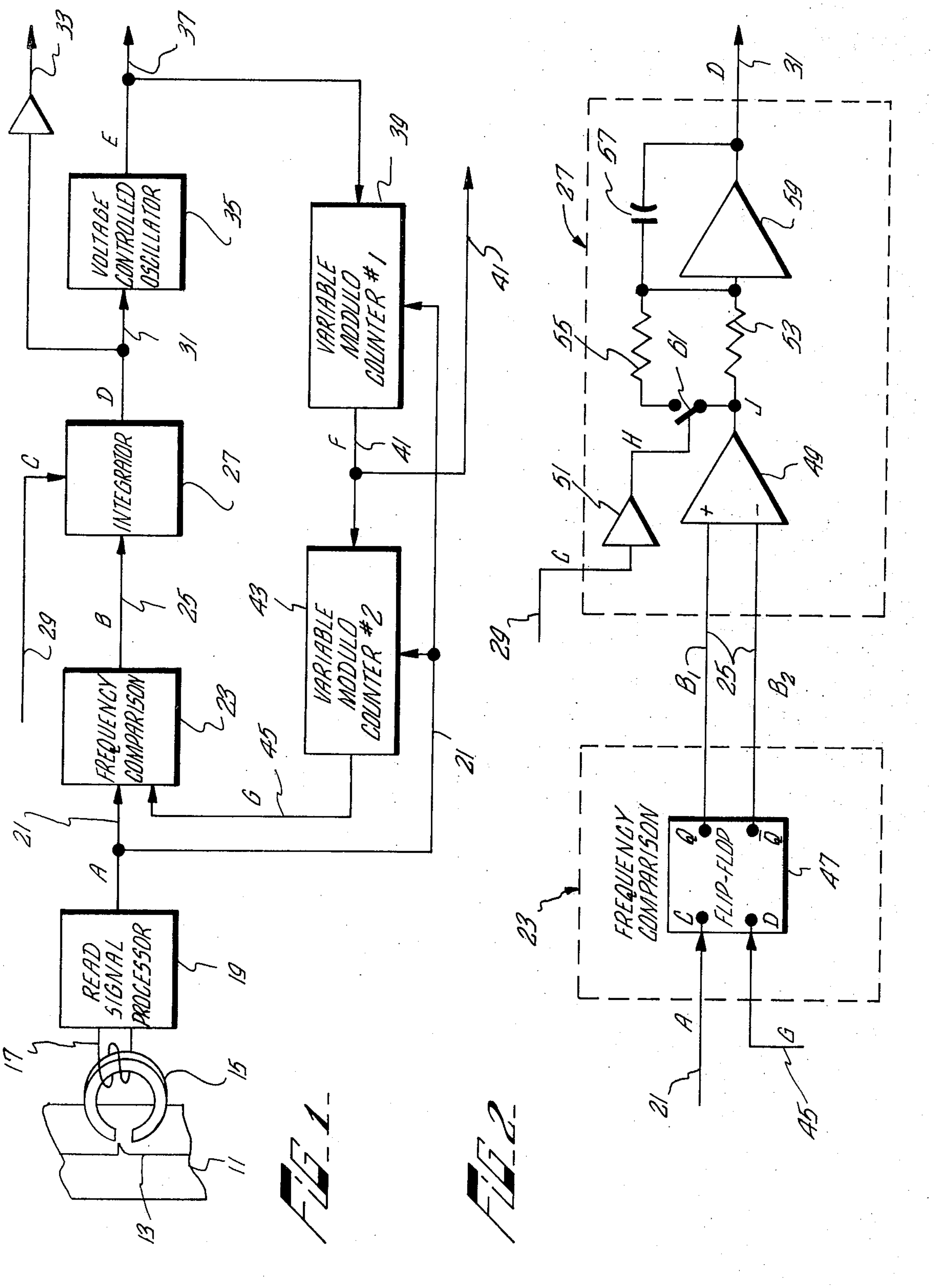
FIG. 1 is a clock diagram illustration of the preferred embodiment of this invention.
FIG. 2 is a schematic illustration of several of the elements of FIG. 1.

Referring first to FIG. 1, an electromagnetic transducer 15 senses a recorded flux transition 13 once for every revolution of a moving rotating storage medium 11. This flux transition is transported to a read signal processor 19 over lines 17. This read signal processor functions to filter out spurious noise signals and to provide a narrow outgoing pulse at the point in time the flux transition was sensed. Circuitry for accomplishing this pulse shaping is well within the purview of a person of ordinary skill in the art and will not be further discussed herein. The resulting index signal is then supplied to a frequency comparison circuit 23, number 2 variable modulo counter 43, and number 1 variable modulo counter 39, over line 21. The index signal resets the modulo counters 39 and 43. The frequency comparison circuit 23, which will be hereinafter described more completely, compares the occurrence of this index signal with the occurrence of a signal from the number 2 variable modulo counter 43, received over line 45. If the index signal occurs prior to the signal from the counter 43, the comparison circuit 23 generates one type of error signal. If the signal from the counter 43 occurs first, the comparison circuit 23 generates another type of error signal, as will be more specifically described below.

The integrator 27, which will be more specifically described below, receives the binary error indication at its input 25 and decodes it into an analog voltage, such as a ramp signal. This analog voltage, both, represents the speed of the magnetic storage medium, on line 33, and acts to control the output of a voltage controlled oscillator 35, on line 31. The output of the voltage controlled oscillator 35 is a series of clock pulses on line 37, the frequency of these clock pulses being varied according to the voltage input signal, on line 31. The clocking signals on line 37 are utilized, by a rotating storage medium system, in a manner well known to those of ordinary skill in the art.

These clock signals are supplied to a number 1 variable modulo counter 39. The structure and operation of such a counter is well known in the art and will not be herein further described, except to say that a modulo counter generates an output signal only when the input pulses exceed by one bit the modulo of the counter. A variable modulo counter has the further capability of varying, in response to either manual or remote electronic control, the modulo of the counter.

For this particular embodiment, the number 1 variable modulo counter 39 has a modulo that will divide the clock signals being received from the voltage controlled oscillator 35 to produce the desired sector mark signals on line 41. These sector mark signals are utilized in rotating storage medium systems in a manner that is well known to those of ordinary skill in the art, therefore, no discussion to that effect is presented herein.

These sector mark signals, on line 41, are supplied to a number 2 variable modulo counter 43, which may be identical to the variable modulo counter 39, except that its modulo generally is different. The modulo of the number 2 modulo counter 43 is chosen so that the sector mark signals being received from line 41 are divided down to a once-per-revolution pulse, produced on line 45. This pulse, as was noted above, is compared with the index signal from the rotating storage medium.

Referring now to FIG. 2, wherein the frequency comparison circuit 23 and the integrator circuit 27 are more specifically illustrated, the index signal recovered from the rotating magnetic medium 11 (FIG. 1) is supplied to the frequency comparison circuit 23 over line 21. The output of the number 2 variable modulo counter 43 is also supplied to the frequency comparison circuit 23 over line 45. The basic component of the frequency comparison circuit is a D-type flip-flop 47. The index signal from the storage medium is supplied to the C, or clock, input of flip-flop 47. Whenever the signal on line 45 is high during the time that a transition from a low to a high occurs at the C input of the flip-flop 47, on line 21, the Q output of the flip-flop 47 will be high and $\overline{Q}$ output will be low. Whenever the signal level on line 45 is low and the signal level on line 21 changes from a low to a high, the Q output of the flip-flop 47 will be low and the $\overline{Q}$ output will be high.

The Q and $\overline{Q}$ outputs of the flip-flop 47 are supplied to a two input level inverting amplifier 49 over lines 25. The level inverting amplifier 49 has a non-inverting input plus an inverting input, designated as minus. Thus whenever the Q output of the flip-flop 47 is high, the level inverting amplifier 49 will generate an output voltage that is positive. Whenever the $\overline{Q}$ output of the flip-flop 47 is high, the level inverting amplifier 49 will generate an output voltage that is negative.

The output voltage from the amplifier 49 is supplied to an integrating circuit made up of resistors 55, 53, capacitor 57 and operational amplifier 59. The function of this integrating circuit is to integrate the voltage levels received from the level inverting amplifier 49. The signal output of the integrator, on line 31, in response to the received voltage levels, is a gradually increasing or decreasing voltage level or ramp. The positive or negative slope of this signal depends on the Q outputs of the flip-flop 47, as will be explained below.

To provide for a more rapid response from the integrator 27 during the period when the rotating storage medium is going from zero to some nominal velocity, a voltage controlled electronic switch 61 is connected in the integrating circuit between the resistors 55 and 53, to connect them in parallel when the switch is closed, or take resistor 55 out of the circuit when the switch is open. A logic level high is received on line 29 from circuitry in the drive of the rotating storage medium when the medium is rotating at some fixed percentage below its determined nominal velocity. logic level on line 29 may be obtained by monitoring the frequency of the index pulses and causing a high to be generated when the frequency is below a certain value. This high on line 29 is received by a level converting amplifier 51 which converts this binary high to a voltage that causes the switch 61 to close. When the rotating storage medium reaches the predetermined percentage of its nominal velocity, the signal on line 29 goes to a binary low causing the level converting amplifier 51 to have a zero voltage output, thereby permitting the switch 61 to return to its normally open position. With the switch 61 open, the gain of the integrator 27 is lower than when the switch is closed because when the switch 61 is closed, resistors 53 and 55 are in parallel causing the total resistance in the circuit to be reduced. This relationship occurs because gain is inversely proportional to input resistance of the operational amplifier 59.

Figure 3:
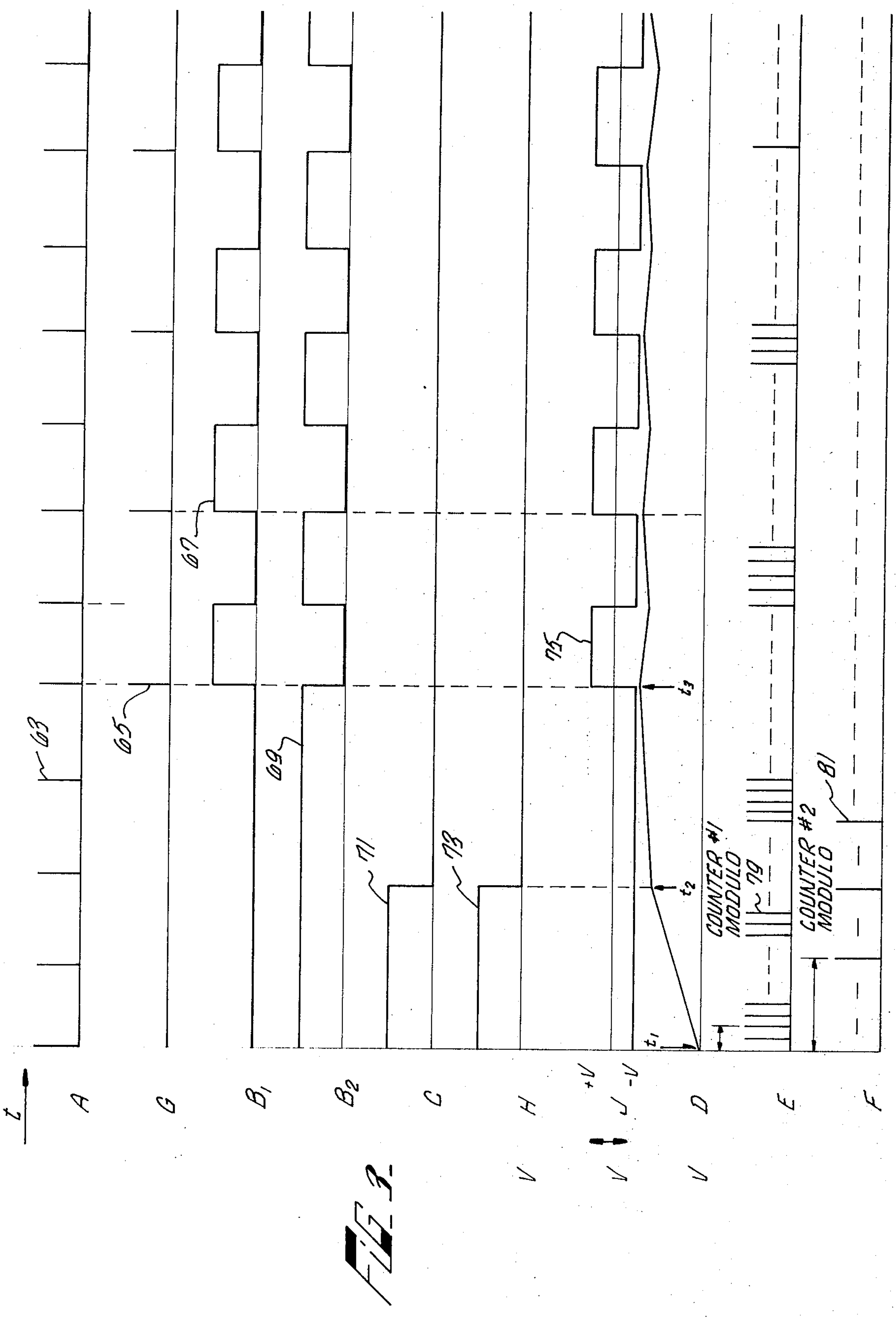
FIG. 3 is a pulse diagram illustrating the functional relationships of the elements of FIGS. 1 and 2.

The functional interrelationship of the elements of the invention illustrated in FIGS. 1 and 2 will now be described in conjunction with the idealistically illustrated signal trains of FIG. 3. As noted earlier, the output of the read signal processor 19 is a once-per-revolution index signal read from the rotating storage medium 11 (FIG. 1). This index signal 63 reoccurs in a signal train A at a frequency that depends on the speed of rotation of the rotating storage medium. This signal train acts as a reference for the frequency comparison circuit 23. The other input to the frequency comparison circuit is the low to high transitions 65 from the number 2 variable modulo counter 43. These transitions 65 occur only when an index pulse 63 occurs too late to reset the counter 43 (FIG. 1) before its modulo is exceeded.

If the signal 63, supplied to the clock input of the flip-flop 47, occurs prior in time to any low to high transition being generated by the variable modulo counter 43, the output signal at $B_1$ will be a low and the output signal 69 at $B_2$ will be a high, thereby supplying the level inverting amplifier 49 (FIG. 2) with a signal at its inverting input, causing the output signal 75 at J of the level inverting amplifier 49 to be a negative voltage. This negative voltage level is integrated, along with the other subsequent negative voltage levels, by the integrating circuit composed of resistors 53 and 55, capacitor 57 and operational amplifier 59 to produce a signal 77 at D that is a positive sloped voltage.

This increasing voltage is supplied to the voltage controlled oscillator 35 (FIG. 1) to increase the frequency of clock pulses 79 generated by it at E. As the frequency of these clock pulses is increased, in response to the negative voltage level being supplied to the integrator 27 (FIG. 1), the output, at G, of number 2 modulo counter 43 (FIG. 1) will subsequently have a positive transition. This will occur when the modulo of the counter 43 is exceeded prior to the occurrence of an index signal A. WHen this occurs, the G input of the flip-flop 47 (FIG. 2) will be high at the time the index signal is received, thereby causing the Q output of flip-flop 47 to have a signal 67 at $B_1$ that is high. Consequently the $\overline{Q}$ output of flip-flop 47 will be low. This will be supplied to the non-inverting input of the level inverting amplifier 49 causing the output signal 75 at J to become a positive voltage. This positive voltage is supplied to the integrating network made up of resistors 53 and 55, capacitor 57 and operational amplifier 59 to produce a negative sloped voltage level at its output D. This voltage level is supplied to the voltage controlled oscillator 35 to cause the clock pulses 79 of train E to decrease proportionately in frequency. In the above manner the clock signals 79 at E will be regulated within a certain tolerance limit and be synchronized with the rotational speed variations of the rotating storage medium 11 (FIG. 1), as directed by the index signal 13 (FIG. 1) recorded thereon.

The voltage controlled oscillator 35 (FIG. 1) has an upper and lower limiting frequency. If, during start-up the oscillator is at its lower limit it will remain there until the ramp voltage input signal on line 31 causes it to go to a higher frequency. If the oscillator starts off at its upper limit frequency, its output frequency will slowly decrease to the nominal value, as dictated by the ramp voltage input signal line 31. During the period when the rotational magnetic medium is starting from zero velocity and accelerating to its nominal velocity, the output frequency of the voltage controlled oscillator will at least be at its lower limit. At a time $t_1$ when the index signal 63, at A, starts to reset the modulo counter 43 prior to its generating a low to high transition, the ramp voltage on line 31 will exhibit an increasing positive slope, until $t_3$ when the modulo counter 43 generates a low to high transition prior to the occurrence of an index pulse 63. This occurs when the frequency output of the voltage controlled oscillator 35 has been driven above its nominal frequency.

To get the voltage controlled oscillator 35 to lock on as fast as possible, a logic level 71 from the drive of the rotating magnetic storage medium 11 is received by the logic level converting amplifier 51. If it is a high, the output signal 73 of the logic level converting amplifier will be a voltage level which causes switch 61 to close. Because switch 61 is closed, the gain of the integrating circuit network consisting of resistors 53, 55, capacitor 57 and operational amplifier 59 is increased, thereby causing the slope of the positive going voltage at the output of the integrating network to be greater during $t_1$ to $t_2$, until the switch is again opened. This, of course, occurs when the logic level 71 drops to a low, at the time $t_2$ when the predetermined percentage of nominal rotational velocity of the rotating storage medium 11 is reached.

In view of the above discussion, it is obvious that an improved clock and signal mark generator for a rotating storage medium system has been invented and it should be understood, of course, that the foregoing disclosure relates only to preferred embodiments of the invention and that numerous modifications may be made therein without departing from the spirit and the scope of the invention as set forth in the appended claims.

What is claimed is:

1. A clock and sector mark signal generator for use with a rotating storage medium, having a means for generating a first once-per-revolution signal synchronized to the velocity variations of said storage medium, comprising:

means for generating a plurality of clock signals at a predetermined nominal frequency;

first means for dividing the clock signals by a selectable factor to generate sector mark signals;

second means for dividing the sector mark signals by a selectable factor to generate a second once-per-revolution signal; and means for comparing the occurrence times of the first and second once-per-revolution signals to produce a control signal for regulating the frequency of the plurality of clock signals from said clock generating means.

2. The clock and sector mark signal generator of claim 1 wherein said first means and said second means comprises variable modulo pulse counters, the first variable modulo counter having its input connected to the output of said clock signal generating means and counting the plurality of clock signals from said clock signal generating means, the second variable modulo counter having its input connected to the output of said first variable modulo counter and counting the output signals from said first variable modulo counter.

3. The clock and sector mark signal generator of claim 1 wherein said means for comparing the occurrence times of the first and second once-per-revolution signals comprises a D-C binary flip-flop circuit, the first once-per-revolution signal being supplied to the C input of said flip-flop and the second once-per-revolution signal being supplied to the D input of said flip-flop.

4. The clock and sector mark signal generator of claim 3, further comprising means for producing a control signal for regulating the frequency of the plurality of clock signals from said clock generating means in response to signals from said binary flip-flop.

5. The clock and sector mark signal generator of claim 4 wherein said means for producing a control signal comprises an integrating circuit utilizing a dual input level inverting amplifier, the Q output of said D-C flip-flop connected to the noninverting input of said amplifier and the $\bar{Q}$ output of said D-C flip-flop being connected to the inverting input of said amplifier.

6. The clock and sector mark signal generator of claim 5 wherein said integrating circuit responds to a speed related signal from said rotating storage medium to select a higher gain for lower speeds of said storage medium and a lower gain for higher speeds of said storage medium.

7. The clock and sector mark signal generator of claim 1, further comprising means for producing a control signal for regulating the frequency of the plurality of clock signals from said clock generating means in response to signals from said comparing means.

8. The clock and sector mark signal generator of claim 7 wherein said means for providing a control signal comprises an integrating circuit utilizing a dual input level inverting amplifier, the output signals from said comparing means being supplied to said amplifier.

9. The clock and sector mark signal generator of claim 8 wherein said integrating circuit responds to a speed related signal from said rotating storage medium to select a higher gain for lower speeds of said storage medium and a lower gain for higher speeds of said storage medium.

10. The clock and sector mark signal generator of claim 5 wherein said integrating circuit has a selectable gain.

* * * * *